No. 858,818. PATENTED JULY 2, 1907.
D. W. & G. M. NICHOLS.
VEHICLE WHEEL.
APPLICATION FILED MAY 31, 1906.

WITNESSES:

Daniel W. Nichols
George M. Nichols INVENTORS

By

ATTORNEYS

UNITED STATES PATENT OFFICE.

DANIEL W. NICHOLS AND GEORGE M. NICHOLS, OF FARIBAULT, MINNESOTA.

VEHICLE-WHEEL.

No. 858,818.　　　　Specification of Letters Patent.　　　　Patented July 2, 1907.

Application filed May 31, 1906. Serial No. 319,621.

*To all whom it may concern:*

Be it known that we, DANIEL W. NICHOLS and GEORGE M. NICHOLS, citizens of the United States, residing at Faribault, in the county of Rice and State of Minnesota, have invented a new and useful Vehicle-Wheel, of which the following is a specification.

The present invention relates to a road wheel construction for vehicles, and one of the objects thereof is to provide a wheel which possesses ample resiliency to absorb the shocks due to the unevenness in the road, but without having the liability of being disabled as is the case with pneumatic tires.

A further object of the invention is to provide a construction which is simple, inexpensive and substantial.
With these ends in view, the invention comprises the various details of construction and combination of parts as will be more clearly described hereinafter and finally specified in the claims appended hereto.

Figure 1:
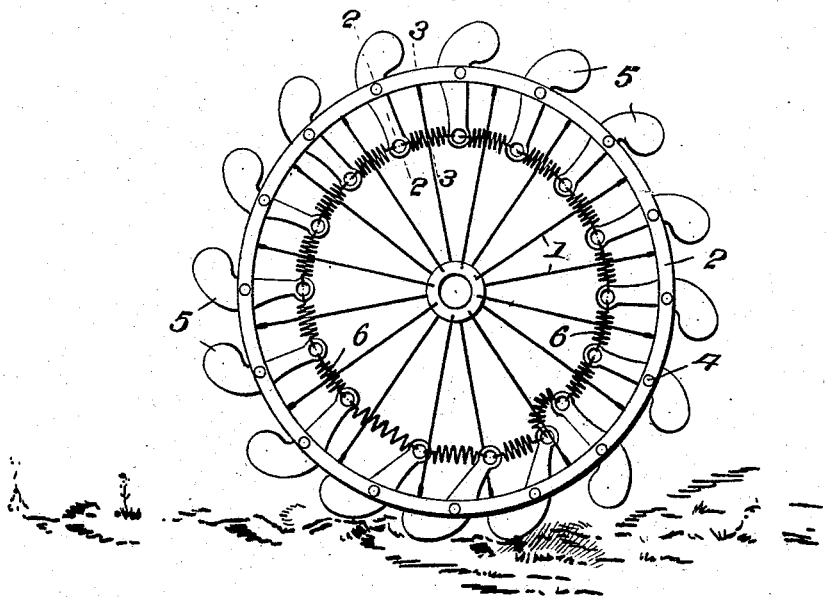
Figure 2:
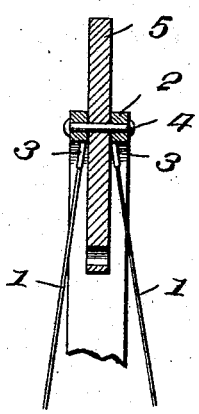
Figure 3:
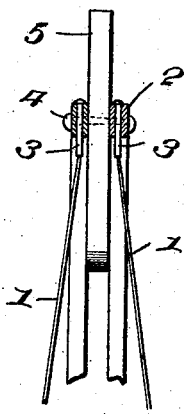
Figure 4:

In the accompanying drawings which illustrate one embodiment of the invention—Figure 1 is an elevation of the wheel. Figs. 2 and 3 are detail sectional views, respectively, on the lines 2—2 and 3—3 of Fig. 1, and Fig. 4 is a perspective view of one of the tread members.

As shown in the present case, the wheel includes the usual wire spoke and hub construction, but it is to be understood that any other construction may be employed if desired. The spokes 1 are attached at their outer ends to the metal rings 2. These rings may be of rectangular cross section or angular, as shown, or one ring may be employed which is of channel shape section. One set of spokes have their outer ends secured to one ring and those of the other set to the other ring. The spokes are connected to the ring by means of the screw nipples 3 which screw into tapped openings in the ring.

Mounted on pivots or bolts 4 and disposed between the rings 2 are tread members 5 equally spaced around the rings at suitable intervals. Each of these members is provided at its inner end with an extension spring, which spring, at one end, may be suitably fastened to the wheel. As shown in the present case, however, these springs 6 are so arranged that the ends of each are connected to adjacent members so that in effect they constitute an annular spring to which the inner ends of the tread members are connected at regular distances. The springs are so arranged that they tend to maintain the tread members in approximately radial position with respect to the wheel, but permit of the members turning on their pivots as the weight of the wheel is brought to bear upon them. In other words, as the wheel rotates, the tread members successively come in contact with the road bed and gradually yield to the weight of the wheel and produce a cushioning effect so that the shocks incident to travel are not transferred to the vehicle body. The tread members may be made of wood, metal or any other suitable material and they are curved at their outer ends on such a line as to permit of their moving from their normal radial position to the more nearly tangential position they assume when the total weight of the wheel is brought to bear upon them. When the tire of the wheel is made of channel iron the web portion of the tire is provided with longitudinal slots for receiving the tread members.

The operation is as follows: When the vehicle wheel is at rest, the springs of the tread members at the bottom of the wheel are flexed or extended, and as the weight of the wheel is transferred from point to point during rotation the successive tread members are actuated and their respective springs flexed, thereby cushioning the wheel and absorbing shocks.

We have described the principle of operation of the invention, together with the apparatus which we now consider to be the best embodiment thereof, but we desire it to be understood that the apparatus shown is merely illustrative and that the invention can be carried out by other means.

What is claimed is:—

1. A wheel, comprising a rim, a plurality of pivotally mounted tread members disposed normally in radial position with one end projecting outwardly beyond the rim and the other end extending inwardly therefrom, and springs arranged in the form of a circle disposed inwardly from the rim and connected to the inner ends of the members for opposing the movement of the latter.

2. A wheel comprising a rim, tread members pivotally mounted thereon and normally extending in radial position with respect thereto and each having a portion extending inwardly from the rim, and springs connecting the inner ends of adjacent members together for yieldingly opposing the movement thereof.

3. In a wheel, the combination of a rim comprising two rings, tread members arranged between the rings and each having a portion extending inwardly from the rim, pivots for mounting the tread members on said rings, and means connected with the inner ends of the members for yieldingly opposing movement of the latter on their pivots.

In testimony that we claim the foregoing as our own, we have hereto affixed our signatures in the presence of two witnesses.

DANIEL W. NICHOLS.
　　　　　　　　　　GEORGE M. NICHOLS.

Witnesses as to Daniel W. Nichols:
　NELLIE LAWRENCE,
　ROLAND G. SANFORD.

Witnesses as to George M. Nichols:
　F. LUKE NICHOLS,
　A. W. HAWN.